(12) United States Patent
Fourney

(10) Patent No.: US 11,548,734 B2
(45) Date of Patent: Jan. 10, 2023

(54) GRID SORTER

(71) Applicant: Laitram, L.L.C., Harahan, LA (US)

(72) Inventor: Matthew L. Fourney, Laurel, MD (US)

(73) Assignee: Laitram, L.L.C., Harahan, LA (US)

( * ) Notice: Subject to any disclaimer, the term of this patent is extended or adjusted under 35 U.S.C. 154(b) by 112 days.

(21) Appl. No.: 17/277,135

(22) PCT Filed: Oct. 10, 2019

(86) PCT No.: PCT/US2019/055657
§ 371 (c)(1),
(2) Date: Mar. 17, 2021

(87) PCT Pub. No.: WO2020/086292
PCT Pub. Date: Apr. 30, 2020

(65) Prior Publication Data
US 2022/0017306 A1  Jan. 20, 2022

Related U.S. Application Data

(60) Provisional application No. 62/748,808, filed on Oct. 22, 2018.

(51) Int. Cl.
*B65G 13/10* (2006.01)
*B65G 43/08* (2006.01)
(Continued)

(52) U.S. Cl.
CPC ............. *B65G 13/10* (2013.01); *B65G 43/08* (2013.01); *B65G 47/46* (2013.01); *B65G 47/54* (2013.01); *B65G 2203/0233* (2013.01)

(58) Field of Classification Search
CPC ........ B65G 13/10; B65G 43/08; B65G 47/46; B65G 47/54; B65G 2203/0233
See application file for complete search history.

(56) References Cited

U.S. PATENT DOCUMENTS 3,710,917 A    1/1973  Black et al.
6,005,211 A   12/1999  Huang et al.
(Continued)

FOREIGN PATENT DOCUMENTS

BE      835748 A       5/1976
DE    3513381 A1 *   10/1986  ............. B65G 47/53
(Continued)

OTHER PUBLICATIONS

GridSorter, Karlsruher Institut fur Technologie, Karlsruhe, Germany, May 2014.
(Continued)

*Primary Examiner* — Gene O Crawford
*Assistant Examiner* — Lester Rushin, III
(74) *Attorney, Agent, or Firm* — James T. Cronvich

(57) ABSTRACT

A grid sorter for discharging articles received from many inputs to selected discharge destinations. The grid sorter comprises a rectangular grid of parallel conveyor lines. Each line has a series of bidirectional conveyors fed articles by infeed conveyors at each end of the line. Omnidirectional-roller sorters, at the intersections of the conveyor lines, can pass articles received from one line in multiple directions: along that same line; in either direction to an intersecting line; or obliquely to a selected discharge between lines. Omnidirectional rollers in the omnidirectional-roller sorters are controlled by a controller to push articles in selected directions to predetermined discharge destinations.

14 Claims, 5 Drawing Sheets

(51) Int. Cl.
*B65G 47/46* (2006.01)
*B65G 47/54* (2006.01)

(56) References Cited

U.S. PATENT DOCUMENTS

| | | | |
|---|---|---|---|
| 6,230,872 | B1 | 5/2001 | Huang et al. |
| 6,981,580 | B2 * | 1/2006 | Meyer .................... B65G 13/02 |
| | | | 198/779 |
| 8,113,334 | B2 | 2/2012 | Layne |
| 8,376,118 | B2 | 2/2013 | Layne |
| 8,479,912 | B2 | 7/2013 | Layne |
| 8,655,484 | B2 | 2/2014 | Stoll et al. |
| 8,978,879 | B2 | 3/2015 | Fourney |
| 9,604,258 | B2 | 3/2017 | Layne et al. |
| 2006/0283689 | A1 | 12/2006 | Schiesser et al. |
| 2011/0022221 | A1 | 1/2011 | Fourney |
| 2012/0298481 | A1 * | 11/2012 | Fourney ................. B65G 39/00 |
| | | | 198/413 |
| 2013/0220775 | A1 | 8/2013 | Faist et al. |
| 2014/0116841 | A1 | 5/2014 | Wilkins |
| 2014/0262686 | A1 * | 9/2014 | Schroader .............. B65G 47/22 |
| | | | 198/454 |
| 2016/0023848 | A1 | 1/2016 | Fourney |
| 2017/0100749 | A1 | 4/2017 | Hartmann et al. |
| 2019/0135542 | A1 | 5/2019 | Itoh et al. |

FOREIGN PATENT DOCUMENTS

| | | | | |
|---|---|---|---|---|
| DE | 3908105 | A1 * | 9/1990 | ............. B65G 13/10 |
| JP | S63212607 | A | 9/1988 | |
| JP | H08198436 | A | 8/1996 | |
| JP | 2001240226 | A | 9/2001 | |
| KR | 101335779 | B1 * | 12/2013 | |
| WO | 2014012861 | A1 | 1/2014 | |

OTHER PUBLICATIONS

Supplementary European Search Report, European Patent Application No. 19875748.6, dated Jul. 8, 2022, European Patent Office, Munich, Germany.

* cited by examiner

GRID SORTER

BACKGROUND

The invention relates generally to power-driven conveyors and in particular to conveyors for sorting articles.

The increasing demand for next-day delivery of articles such as parcels, packages, and letters requires high-throughput sorting systems to rapidly direct articles received from multiple sources to selected destinations.

SUMMARY

One version of a grid sorter embodying features of the invention comprises a plurality of first conveyor lines arranged in parallel in a first direction and a plurality of second conveyor lines arranged in parallel in a second direction perpendicular to the first direction. The first and second conveyor lines intersect at a plurality of intersections to form a grid. The first conveyor lines include series of first conveyors, and the second conveyor lines include series of second conveyors. At least some of the first and second conveyors are omnidirectional-roller sorters disposed at selected intersections. Each of the swivel sorters includes a plurality of omnidirectional rollers. A controller controls the omnidirectional rollers to direct articles along selected conveying paths on the omnidirectional-roller sorters. A plurality of discharges adjacent at least some of the omnidirectional-roller sorters in the first and second conveyor lines receive articles from the omnidirectional-roller sorters.

Another version of a grid sorter comprises a plurality of first conveyor lines arranged in parallel in a first direction and including a plurality of first bidirectional conveyors operable to convey articles in or opposite to the first direction and a plurality of second conveyor lines arranged in parallel in a second direction perpendicular to the first direction and including a plurality of second bidirectional conveyors operable to convey articles in or opposite to the first direction. The first and second conveyor lines intersect at a plurality of intersections to form a grid. A plurality of omnidirectional-roller sorters are each disposed at one of the intersections between two of the bidirectional conveyors in one of the first conveyor lines and between two of the bidirectional conveyors in one of the second conveyor lines. Each of the omnidirectional-roller sorters includes a plurality of omnidirectional rollers, which are controllable to direct articles along selected conveying paths on the omnidirectional-roller sorter. A plurality of discharges are disposed in the grid between the first and second conveyor lines to receive articles from the swivel sorters.

DETAILED DESCRIPTION

Figure 1:
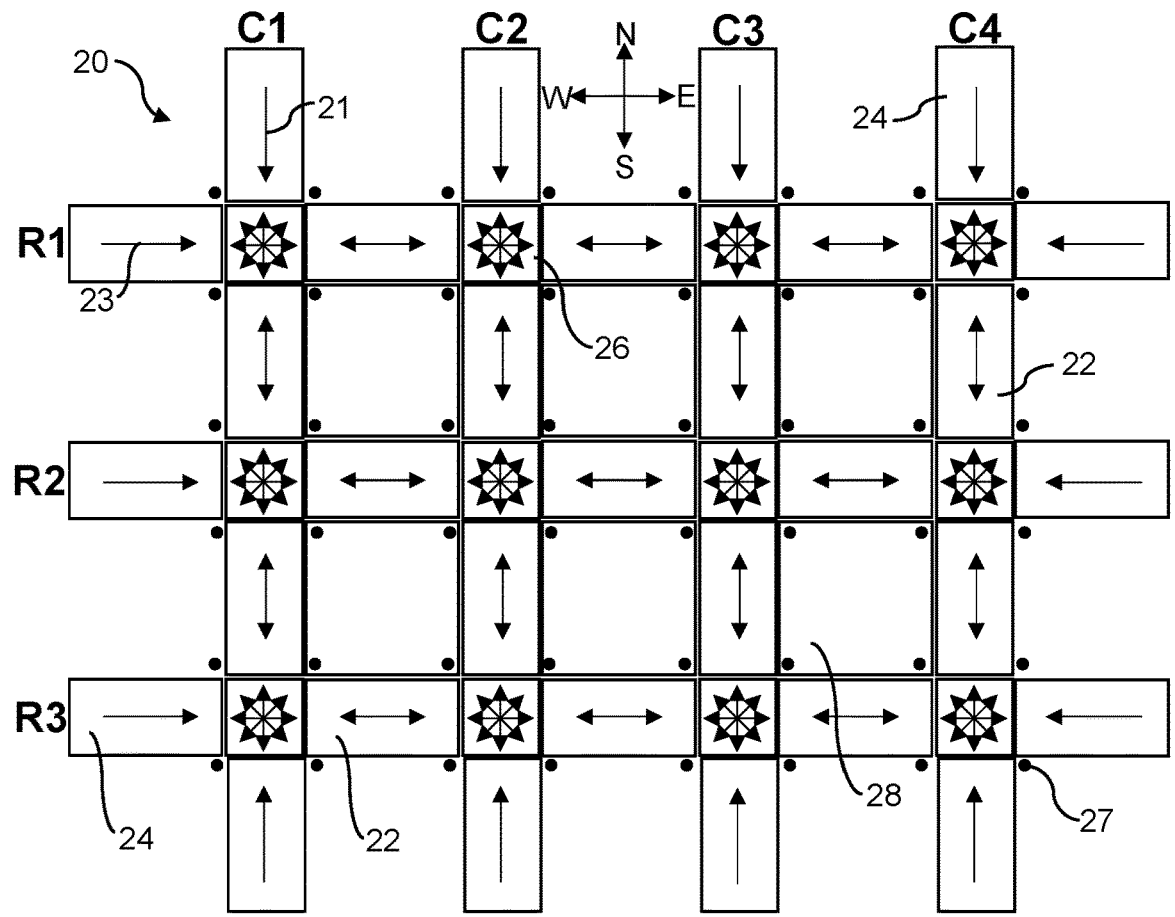
FIG. 1 is a schematic top plan view of a grid sorter embodying features of the invention.

One version of a grid sorter embodying features of the invention is shown in FIG. 1. The grid sorter 20 comprises four columns of north-south (N-S) conveyor lines C1-C4 and three rows of east-west (E-W) conveyor lines R1-R3. Four columns and three rows are used as just one example to illustrate the operation of the grid sorter. The four N-S conveyor lines C1-C4 are arranged in parallel, and the three E-W conveyor lines R1-R3 are arranged in parallel, perpendicular to the N-S conveyor lines to form a conveyor grid. The N-S conveyor lines convey articles in the grid in or opposite to a first direction 21, and the E-W conveyor lines convey articles in or opposite to a second direction 23. Each conveyor line is composed of a series of aligned conveyor segments including bidirectional conveyors 22, infeed conveyors 24 at the ends of each conveyor line, and omnidirectional-roller sorters 26 at the intersections of the N-S and E-W conveyor lines. The infeed conveyors 24 at the ends of the conveyor lines are arranged to receive and convey articles toward the bidirectional conveyors 22 in the interior of the conveyor lines C1-C4, R1-R3.

The omnidirectional-roller sorters 26 at the intersections of the conveyor lines C1-C4, R1-R3 include roller assemblies with rollers that are selectively rotatable and pivotable to convey articles in multiple directions—in and opposite to the first and second directions 21, 23 and in directions between the first and second directions and their opposites—such as N, NW, W, SW, S, SE, E, and NE; i.e., every 45°. For example, an omnidirectional-roller sorter 26 receiving an article traveling from E to W along conveyor line R2 can pass the article forward along the conveyor line in the W direction or can reverse the direction of the article in the E direction. It can alternatively divert the article 90° left or right in the N or S direction onto a N-S conveyor segment 22. Or the omnidirectional-roller sorter 26 can divert the article 45° in the NW, SW, SE, or NE directions to an adjacent discharge 28 disposed in the grid 20 between the N-S and E-W conveyor lines C1-C4, R1-R3. The discharge 28 may be openings through which the article drops onto a discharge conveyor below, onto a chute into a receptacle, or even onto another grid-sort level below in a 3-D arrangement. Each discharge 28 represents a selected destination for the article. Position sensors 27 are distributed throughout the grid as a sensor system configured and adapted to indicate the presence or absence of an article at those positions. Instead of multiple position sensors, a camera with a visioning system could be used as the sensor system configured and adjusted to sense the positions of articles on the grid sorter.

Figure 2:
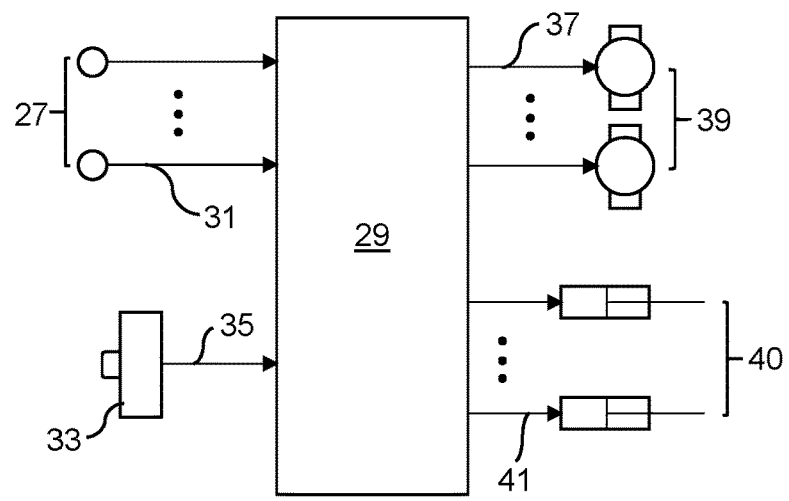
FIG. 2 is a block diagram of a control system usable with a grid sorter as in FIG. 1.

The operation of the grid sorter 20 is controlled by a controller 29 as shown in FIG. 2. The controller 29 may be a general-purpose computer, a programmable logic device, or other programmable device with program and data memory. The controller 29 receives position signals 31 from the position sensors 27. (Alternatively, a camera 33 could provide a video signal 35 from which the positions of the articles on the grid sorter can be determined by the controller 29.) The controller 29, acting as a traffic controller, sends motor control signals 37 to motors 39 driving the infeed conveyors, the bidirectional conveyors, and the omnidirectional-roller sorters. The controller also sends pivot signals 41 to swivel actuators 40 in the omnidirectional-roller sorters.

Figure 3:
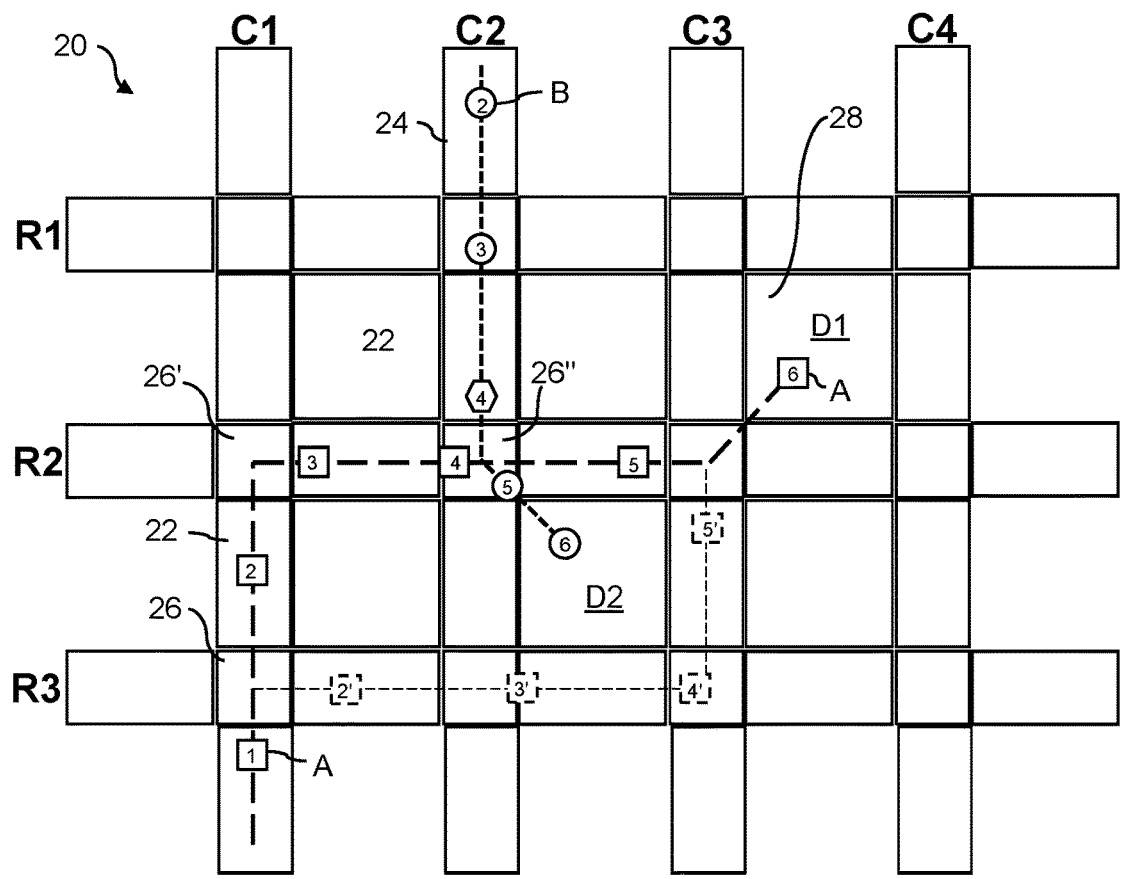
FIG. 3 is a top plan view of the grid sorter of FIG. 1 illustrating its operation.

A simple example of the operation of the grid sorter 20 is shown in FIG. 3 for two articles. A first article A, indicated by solid squares, heads north at time T=1 on the infeed conveyor at the south end of conveyor line C1. The article A is destined for a discharge D1 between N-S columns C3 and C4 and E-W rows R1 and R2. The controller directs the omnidirectional-roller sorter 26 at the C1-R3 intersection to continue conveying the article A north in the N direction onto the adjacent bidirectional conveyor 22, which continues to convey the article north. At time T=2, the article A is about midway along the bidirectional conveyor. The article A continues to be conveyed north until it is received on the omnidirectional-roller sorter 26', which diverts the article A traveling north along the conveyor line C1 to the east in the E direction on the conveyor line R2. At times T=3, 4, and 5 the article A is conveyed to the east along the conveyor line R2 by two bidirectional conveyors and an intervening omnidirectional-roller sorter 26''. After being received on the omnidirectional-roller sorter at the C3-R2 intersection, the controller causes the omnidirectional-roller sorter to divert the article 4 to the northeast (NE) direction and into its selected discharge D1. In the meantime a second article B (indicated by circles) is being conveyed south in the S direction on an infeed conveyor 24 at the north end of the C2 conveyor line at time T=2. The article B continues to be conveyed south over an omnidirectional-roller sorter and a bidirectional conveyor 22. Because the article B reaches the omnidirectional-roller sorter 26'' at the C2-R2 intersection while the other article A is already on it, the controller stops the bidirectional conveyor 22 conveying the article B to prevent the articles from colliding at time T=4. Once the article A has cleared the omnidirectional-roller sorter 26'', the controller restarts the bidirectional conveyor 22 in the line C2 to push the article B onto the C2-R2 omnidirectional-roller sorter. Then the controller adjusts the omnidirectional-roller sorter 26'' to divert the article B to its selected discharge D2 at time T=6. The controller could alternatively have chosen a different route for the article A to take to its destination discharge D1 by diverting the article to the east on the conveyor line R3 with the C1-R3 omnidirectional-roller sorter 26. The article A continues to the east at times T=2', 3', 4' until the C3-R3 omnidirectional-roller sorter diverts the article A 90° counterclockwise to be conveyed north along the conveyor line C3. After time T=5', the article A is diverted by the C3-R2 omnidirectional-roller sorter to the northeast and into the destination discharge D1. If the controller selects that route for the article A, the other article B does not have to stop for the article A to pass because the routes do not intersect at the same time.

In a grid sorter with many N-S and E-W conveyor lines handling many articles simultaneously, the controller determines the routes for each article to take from a starting point on one of the infeed conveyors 24 to a designated discharge 28. With regular position updates from the sensor system, the controller can adjust the routes on the fly and start and stop the infeed conveyors, the bidirectional conveyors, and the omnidirectional-roller sorters or change the directions of the bidirectional and omnidirectional-roller sorters to avoid collisions or alter routes.

Figure 4:
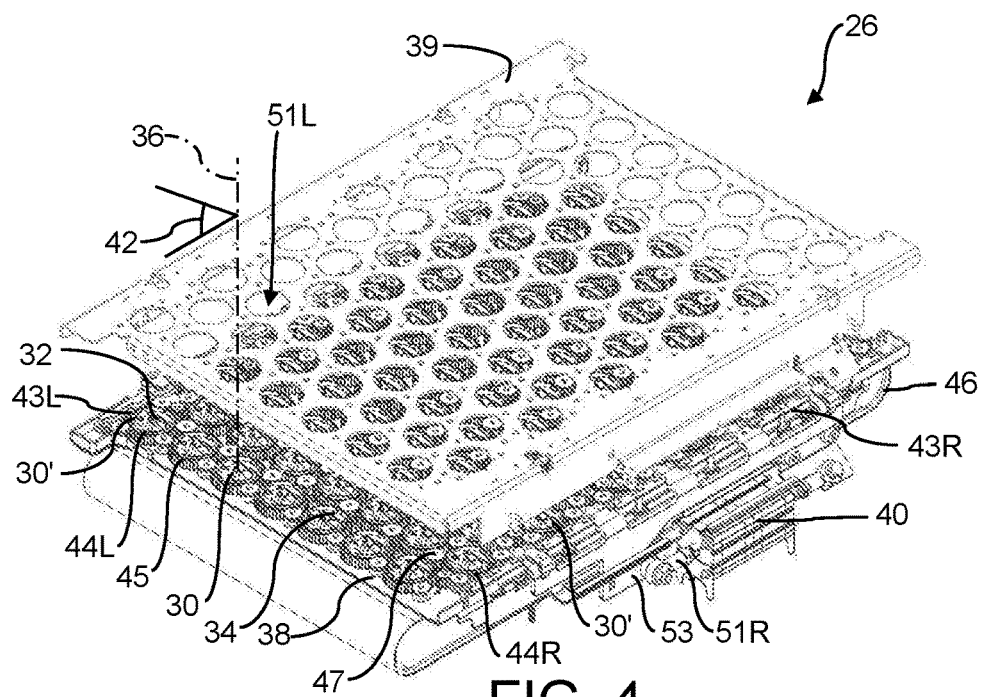
FIG. 4 is a partly exploded, isometric view of an omnidirectional-roller sorter usable in a grid sorter as in FIG. 1.

One example of an omnidirectional-roller sorter 26 embodying features of the invention is shown in FIG. 4. The omnidirectional-roller sorter 26 includes a plurality of roller assemblies 30, each of which has a roller 32 mounted in a frame 34 that is pivotable about a vertical axis 36. The roller assemblies 30 are mounted to a base plate 38 with salient portions of the rollers 32 extending above a cover plate 39 to support conveyed articles. A swivel actuator 40 controls the orientation of the roller assemblies 30 by adjusting their pivot angle 42. In this example the swivel actuator 40 consists of two linear actuators 51L, 51R on opposite sides of the base plate. Each actuator controls the orientation of alternating rows 44L, 44R of the roller assemblies 30. Each actuator 51L, 51R translates a rack gear 43L, 43R through a slide arm 53. The rack gears 43L, 43R engage the large ring gears 45 on the roller assemblies 30' closest to the rack gears. Pinion gears 47 engage the ring gears 45 in each row 44L, 44R so that the roller assemblies 30 in each row pivot together. The rollers 32 in the roller assemblies 30 are actuated to rotate on their axes of rotation by a rotation actuator, such as a bidirectional motor-driven belt 46 contacting the bottoms of the rollers. In this example only one belt is shown serving as a rotation actuator. If, for example, two actuator belts are used, the omnidirectional-roller sorter could be divided into two zones of independently rotated rollers.

Figure 5:
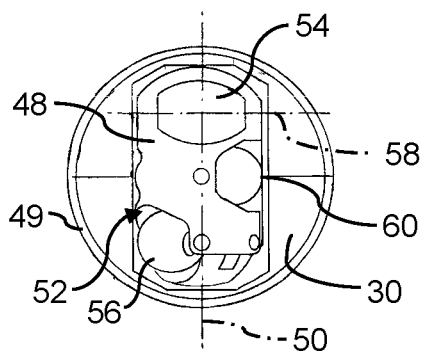
FIG. 5 is a top plan view of a roller assembly usable in an omnidirectional-roller sorter as in FIG. 4.
Figure 6:
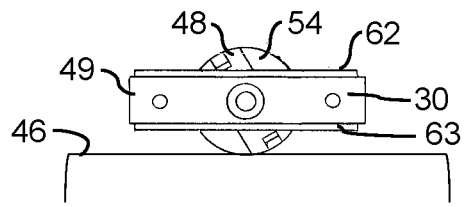
FIG. 6 is a side elevation view of the roller assembly of FIG. 5.

Details of an omnidirectional roller in the roller assemblies of FIG. 4 are shown in FIGS. 5 and 6. The roller assembly 30 includes a frame 48 supported in a support ring 49 and rotatable about a main axis of rotation 50. Openings 52 in the frame 48 receive small rollers 54. Each small roller 54 is paired in rolling contact with a similar small roller received in the opening on the other side of the frame 48 to form a mutually-actuating roller set 56. Each roller assembly 30 has at least one such mutually-actuating roller 54. In this example, three mutually-actuating roller sets are disposed along the axial length of the frame 48 at different orientations. The small rollers 54 in each set rotate on parallel minor axes 58 skewed relative to the main axis of rotation 50 of the frame 48. The outside surfaces 60 of the small rollers 54 extend slightly beyond the frame 48. And salient portions of the roller assembly extend beyond top and bottom faces 62, 63 of the support ring 49 to engage articles on the top and rotation actuators, such as belts 46, on the bottom.

Figure 7:
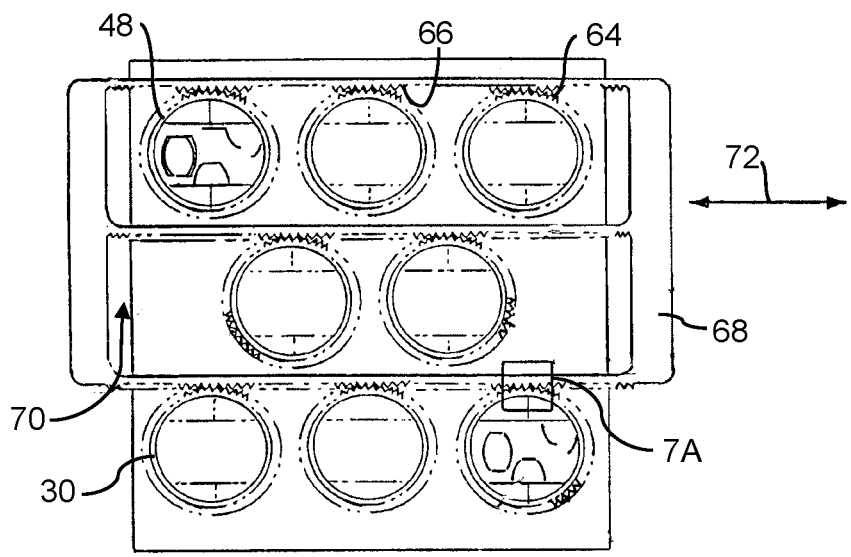
FIG. 7 is a top plan view of an omnidirectional-roller sorter using roller assemblies as in FIG. 5 with a ring gear.
Figure 7A:
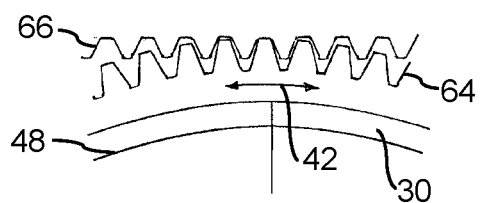
FIG. 7A is an enlarged view showing the swivel actuation of the roller assemblies of FIG. 7.

An example of swivel actuation is shown in FIGS. 7 and 7A. Each roller assembly 48 shown in FIG. 7 has a peripheral ring gear 64. The swivel actuator includes rack gears 66 that engage the ring gears 64 of the roller assemblies 48. The rack gears 66 are formed in a gear plate 68 with cutouts 70 for the roller assemblies 48. The gear plate 68 is translated by an actuating device, such as the linear actuator 40 in FIG. 4, in a translator direction 72 to set the orientation 42 of the omnidirectional roller assemblies 30.

Acting together, the swivel actuator, setting the orientation of the roller assemblies, and the rotation actuator, setting the direction of rotation of the omnidirectional rollers in the roller assemblies, allow the omnidirectional-roller sorter to push articles atop the rollers in any conveying direction along a selected conveying path. In particular, the article-divert, or conveying, angle of the omnidirectional-roller sorter with mutually-actuating rollers is twice the pivot angle. One commercial example of an omnidirectional-roller sorter is the Omni-Directional Sorter sold by Intralox, L.L.C. of Harahan, La., U.S.A. And further details of various versions of omnidirectional sorters usable in the grid sorter of FIG. 1 are disclosed in U.S. Pat. No. 8,978,879, "Multi-Directional Roller Assembly," issued to Laitram, L.L.C. on Mar. 17, 2015. The disclosure of that patent is incorporated into this description by reference.

Figure 8:
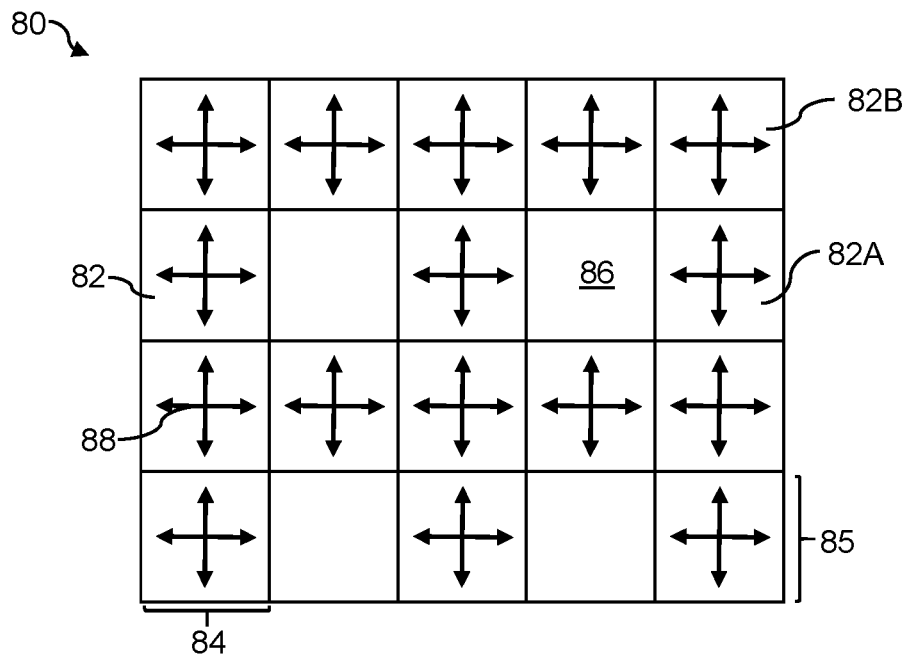
FIG. 8 is a schematic top plan view of a portion of another version of a grid sorter embodying features of the invention.

Another version of a grid sorter 80 is shown in FIG. 8, in which all the conveyors 82 in the first and second intersecting conveyor lines 84, 85 are omnidirectional sorters. Discharges 86 are disposed within the grid at selected non-adjacent intersections in the conveyor lines 84, 85. In this example the discharges 86 are at the intersections of every other first and second conveyor line 84, 85. The swivel sorters 82A on the four sides of the discharges 86 sort to the discharges and convey articles past the discharges, while the omnidirectional-roller sorters 82B at the four corners of the discharges do not sort, but convey articles selectively in one of four directions. In this example the omnidirectional-roller sorters 82 need only adjust the direction of rotation of the rollers and the sorter's conveying direction and the conveying path followed by articles in four directions as indicated by the arrows 88.

Figure 9:
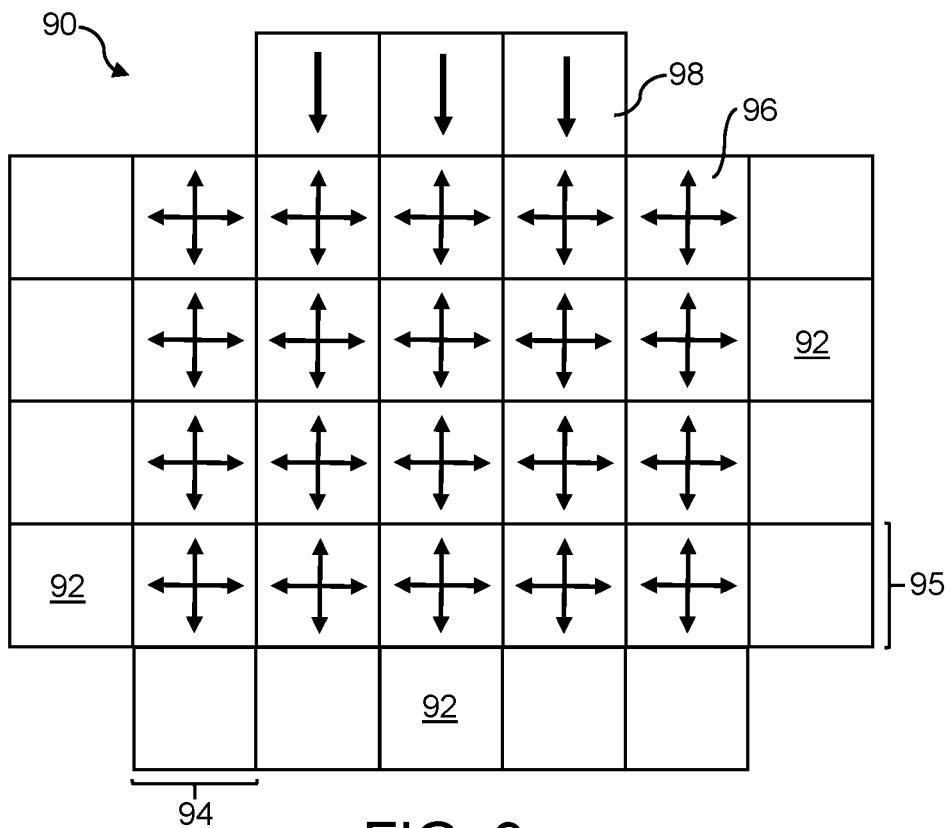
FIG. 9 is a schematic top plan view of a third version of a grid sorter embodying features of the invention.

In the grid sorter 90 shown in FIG. 9, the discharges 92 are at one or both ends of the first and second conveyor lines 94, 95. All the first and second conveyors 96 within the grid are grid sorters as in FIG. 8. The grid sorter 90 is shown in this example with three infeed conveyors 98 feeding articles into the grid from three sources. In all the examples shown in FIGS. 1, 8, and 9, the grid sorters can convey an article along continuous paths that include all the first and second conveyors.

Figure 10:
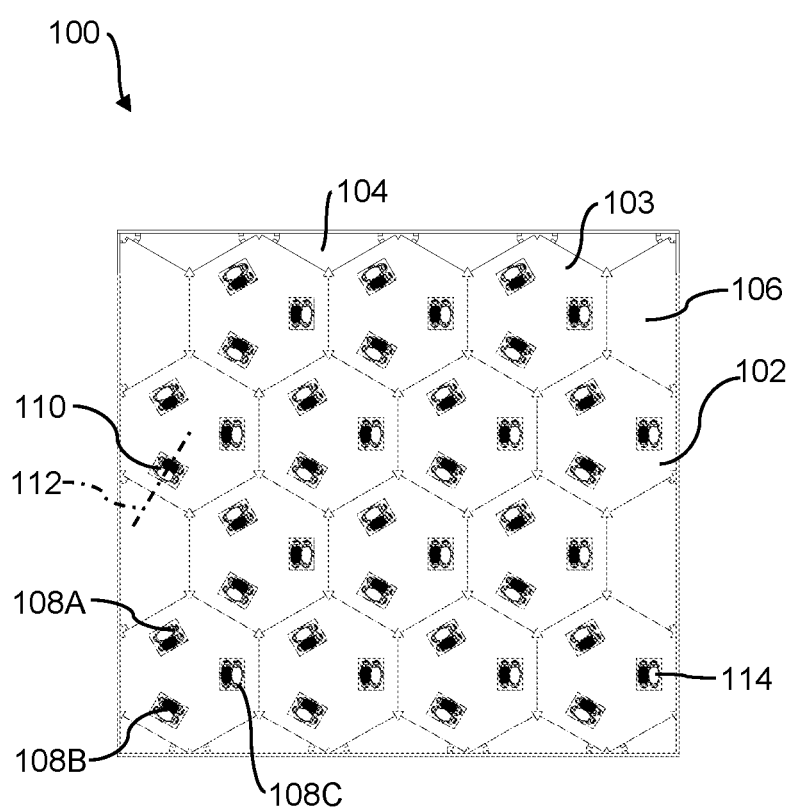
FIG. 10 is a top plan view of another omnidirectional-roller sorter usable in a grid sorter as in FIGS. 1, 8, and 9.

Another version of an omnidirectional-roller sorter that can be used in the grid sorters of FIGS. 1, 8, and 9 is shown in FIG. 10. The omnidirectional-roller sorter 100 comprises a plurality of roller cells 102 in hexagonal plates 103 arranged in a honeycomb pattern. Rollerless triangular and trapezoidal static plates 104, 106 at the edges of the omnidirectional-roller sorter 100 complete the pattern and give the omnidirectional-roller sorter a rectangular shape. Each of the roller cells 102 has three sets 108A-108C of omnidirectional rollers 110. The main axes of rotation 112 of the three sets 108A-108C are fixed 120° apart. The omnidirectional roller 110 has small rollers 114 arranged around its circumference. The axes of rotation of the small rollers 114 on each omnidirectional roller are coplanar in a plane perpendicular to the main axis of rotation 112. In this example each set 108A-108C has two side-by-side omnidirectional rollers I which the small rollers 114 of one are circumferentially offset from those of the other to provide a more uninterrupted roller surface to conveyed articles. But a single omnidirectional roller 110 in each set would suffice in some applications. Each of the roller sets 108A-108C is independently controlled by an associated motor below the top plate 103 of the cell 102. The motors are controlled by the controller (29, FIG. 2), which determines the speed and direction of rotation of each omnidirectional roller 110 required to direct a conveyed article in any conveying direction along any selected conveying path on the omnidirectional-roller sorter 100. A commercial example of such a cellular omnidirectional-roller sorter is the Celluveyor from Bremer Institut für Produktion and Logistik GmbH of Bremen, Germany.

What is claimed is:

1. A grid sorter comprising:
    a plurality of first conveyor lines arranged in parallel in a first direction and including series of first conveyors;
    a plurality of second conveyor lines arranged in parallel in a second direction perpendicular to the first direction and including series of second conveyors, wherein the first and second conveyor lines intersect at a plurality of intersections to form a grid;
    wherein at least some of the first and second conveyors are omnidirectional-roller sorters disposed at selected intersections, each of the omnidirectional-roller sorters including a plurality of omnidirectional rollers;
    a controller controlling the omnidirectional rollers to direct articles along selected conveying paths on the omnidirectional-roller sorters;
    a plurality of discharges adjacent at least some of the omnidirectional-roller sorters in the first and second conveyor lines to receive articles from the omnidirectional-roller sorters;
    wherein each of the omnidirectional rollers has a direction of rotation and is disposed in a roller assembly including:
        a swivel actuator selectively pivoting the roller assemblies to adjust the direction of rotation of the rollers at least in and opposite to the first and second directions;
        a rotation actuator selectively rotating the rollers in the direction of rotation.

2. A grid sorter as claimed in claim 1 wherein all the first and second conveyors are omnidirectional-roller sorters.

3. A grid sorter as claimed in claim 1 wherein the discharges are disposed at an end of at least some of the first or second conveyor lines.

4. A grid sorter as claimed in claim 1 wherein the discharges are disposed at selected non-adjacent intersections.

5. A grid sorter as claimed in claim 1 wherein the discharges are disposed at the intersections of every other first and second conveyor line.

6. A grid sorter as claimed in claim 1 wherein the discharges are disposed in the grid between the first and second conveyor lines.

7. A grid sorter as claimed in claim 1 wherein an article can be conveyed on continuous paths that include all the first and second conveyors.

8. A grid sorter as claimed in claim 1 wherein the swivel actuator selectively pivots the roller assemblies to adjust the direction of rotation of the rollers to directions between the first and second directions and their opposites.

9. A grid sorter comprising:
    a plurality of first conveyor lines arranged in parallel in a first direction and including series of first conveyors;
    a plurality of second conveyor lines arranged in parallel in a second direction perpendicular to the first direction and including series of second conveyors, wherein the first and second conveyor lines intersect at a plurality of intersections to form a grid;
    wherein at least some of the first and second conveyors are omnidirectional-roller sorters disposed at selected intersections, each of the omnidirectional-roller sorters including a plurality of omnidirectional rollers;
    a controller controlling the omnidirectional rollers to direct articles along selected conveying paths on the omnidirectional-roller sorters;
    a plurality of discharges adjacent at least some of the omnidirectional-roller sorters in the first and second conveyor lines to receive articles from the omnidirectional-roller sorters;
    wherein the omnidirectional sorters include a plurality of cells, each having three sets of omnidirectional rollers arranged to rotate on main axes of rotation 120° apart.

10. A grid sorter as in claim 1 comprising:
    a sensor system detecting the positions of articles on the grid sorter and providing position information;

wherein the controller receives the position information from the sensor system and controls the speed and direction of rotation of the omnidirectional rollers in each of the omnidirectional-roller sorters.

11. A grid sorter comprising:
a plurality of first conveyor lines arranged in parallel in a first direction and including a plurality of first bidirectional conveyors operable to convey articles in or opposite to the first direction;
a plurality of second conveyor lines arranged in parallel in a second direction perpendicular to the first direction and including a plurality of second bidirectional conveyors operable to convey articles in or opposite to the second direction, wherein the first and second conveyor lines intersect at a plurality of intersections to form a grid;
a plurality of omnidirectional-roller sorters, each disposed at one of the intersections between two of the bidirectional conveyors in one of the first conveyor lines and between two of the bidirectional conveyors in one of the second conveyor lines, each of the omnidirectional-roller sorters including a plurality of omnidirectional rollers controllable to direct conveyed articles along selected conveying paths on the omnidirectional-roller sorter;
a plurality of discharges disposed in the grid between the first and second conveyor lines to receive articles from the omnidirectional-roller sorters.

12. A grid sorter as in claim 11 wherein the first conveyors include infeed first conveyors at the ends of the first conveyor lines wherein the infeed first conveyors convey articles toward the bidirectional first conveyors and wherein the second conveyors include infeed second conveyors at the ends of the second conveyor lines wherein the infeed second conveyors convey articles toward the bidirectional second conveyors.

13. A grid sorter as in claim 11 comprising a controller to adjust a conveying direction of the omnidirectional-roller sorters to the first direction to pass articles over the omnidirectional-roller sorters along the first conveyor lines or to the second direction to pass articles over the omnidirectional-roller sorters along the second conveyor lines.

14. A grid sorter as in claim 11 comprising a controller to adjust a conveying direction of the omnidirectional-roller sorters to a direction between the first direction and the second direction to pass articles over the omnidirectional-roller sorters to the discharges.

* * * * *